United States Patent
Goss

(10) Patent No.: US 6,236,901 B1
(45) Date of Patent: May 22, 2001

(54) MANUFACTURING SYSTEM AND METHOD FOR ASSEMBLY OF COMPUTER SYSTEMS IN A BUILD-TO-ORDER ENVIRONMENT

(75) Inventor: Lois Goss, Lago Vista, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/053,524

(22) Filed: Mar. 31, 1998

(51) Int. Cl.⁷ .................................................. G06F 19/00
(52) U.S. Cl. ................................ 700/95; 700/79; 700/83; 700/112; 700/114; 700/116; 700/117; 700/241; 700/242; 361/692; 361/702; 361/756; 361/759
(58) Field of Search ...................... 700/95, 2, 241, 700/232, 100, 102, 3, 79, 83, 117, 116, 112, 114, 76, 230, 242; 361/759, 756, 702, 692; 705/16; 713/1, 2, 100

(56) References Cited

U.S. PATENT DOCUMENTS

| | | | |
|---|---|---|---|
| 3,796,327 | 3/1974 | Meyer et al. | 214/38 BB |
| 3,854,889 | 12/1974 | Lemelson | 29/33 P |
| 4,369,563 | 1/1983 | Williamson | 29/568 |
| 4,473,935 | 10/1984 | Tatsuura et al. | 29/429 |
| 4,549,664 | 10/1985 | Gowan et al. | 211/131 |
| 4,621,410 | 11/1986 | Williamson | 29/568 |
| 4,648,167 | 3/1987 | Horvath | 29/428 |
| 4,651,863 | 3/1987 | Reuter et al. | 198/339.1 |
| 4,703,558 | 11/1987 | Mäkinen | 29/784 |
| 4,711,016 | 12/1987 | Genschow et al. | 29/568 |
| 4,738,387 | 4/1988 | Jaufmann et al. | 228/4.1 |
| 4,764,078 | 8/1988 | Neri | 414/273 |
| 4,783,904 | 11/1988 | Kimura | 29/786 |
| 4,815,190 | 3/1989 | Haba, Jr. et al. | 29/430 |
| 4,821,197 | 4/1989 | Kenik et al. | 364/468 |
| 4,823,233 * | 4/1989 | Brown et al. | 361/692 |
| 4,890,969 | 1/1990 | Esser | 414/277 |
| 4,894,908 | 1/1990 | Haba, Jr. et al. | 29/711 |
| 5,024,862 | 6/1991 | Frank | 427/264 |
| 5,120,190 | 6/1992 | Smith et al. | 414/786 |
| 5,144,532 * | 9/1992 | Wessely et al. | 361/702 |
| 5,235,164 | 8/1993 | Noyama et al. | 235/375 |
| 5,310,396 | 5/1994 | Momoi et al. | 483/15 |
| 5,513,427 | 5/1996 | Yokoyama et al. | 29/701 |
| 5,593,269 | 1/1997 | Bernard, II | 414/331 |
| 5,822,216 * | 3/1989 | Satchell, Jr. et al. | 700/232 |
| 5,894,571 * | 4/1999 | O'Connor | 713/2 |

FOREIGN PATENT DOCUMENTS 0 308 248 A2    3/1989    (EP).
0 606 515 A2    7/1994    (EP).

OTHER PUBLICATIONS

Modern Material Handling Productivity Solutions For Manufacturing, Warehousing & Distribution, A Cahners Publication, Nov. 1995, "Less Automation Means More Productivity At Sun" By Tom Feare, pp. 1–4.

* cited by examiner

Primary Examiner—William A. Cuchlinski, Jr.
Assistant Examiner—McDieunel Marc
(74) Attorney, Agent, or Firm—Haynes and Boone, L.L.P.

(57) ABSTRACT

Parallel organized unit-by-unit manufacturing and assembly systems and methods for computer systems and other products advantageously integrate into a build-to-order environment. Responsive to orders received, kit trays are prepared that each hold parts and components needed to build an ordered product. The kit tray is transferred to a work cell where a team builds the product. The product is then tested and repaired, with information regarding any problems provided to the responsible work cell.

51 Claims, 4 Drawing Sheets

MANUFACTURING SYSTEM AND METHOD FOR ASSEMBLY OF COMPUTER SYSTEMS IN A BUILD-TO-ORDER ENVIRONMENT

BACKGROUND OF THE INVENTION

1. Field of the Invention

This invention relates to methods and systems for manufacturing and assembling, and, in particular, to methods and systems for manufacturing and assembling computer systems in a build-to-order environment.

2. Description of the Related Art

Traditionally, manufacturing systems have been designed and constructed based upon a build-to-stock model where large quantities of identical products are assembled to meet forecasted demand and warehoused until that demand occurs. Such manufacturing systems provide economies of scale based upon the large quantities of identical units and can be optimized by increasing the speed with which each manufacturing step is completed. Because build-to-stock manufacturing systems rely on known product configurations, each step in the manufacturing process is known in advance, and so the manufacturing system utilizes progressive build techniques to optimize each stage in the serial assembly process. For products (e.g. a computer system) that include sensitive components, progressive build manufacturing systems can be carefully planned in advance to protect those sensitive components. Once the manufacturing system becomes operational, it will build the same product repeatedly, using the optimized steps.

However, when the process is adapted to build a different product, or a different version of the same product, the manufacturing system must be modified and re-optimized to ensure that the system still protects sensitive components. Moreover, because the progressive build process is serial, each stage depends on timely completion of the previous stage, and thus the entire process is susceptible to problems, inefficiencies, and failures in any of the stages of the system. Additionally, progressive-build manufacturing systems operating in a build-to-stock environment are relatively inflexible, limiting the ability of the manufacturing system to fill small orders economically and to control inventory.

One method used to increase performance in progressive-build manufacturing processes is to include a process step in which identical kits are prepared that hold the components needed to assemble a particular product or to complete a particular manufacturing step. In this way some of the time normally required to select parts for a particular product or manufacturing step can be reduced, and some manufacturing steps can more easily be performed in one location or by one operator or piece of manufacturing equipment (e.g. an industrial robot). For example, U.S. Pat. No. 4,815,190 discloses the use of automated and manual kitting stages for producing identical kits for automobile sub-assemblies. One advantage to using identical kits is that it is relatively easy to know if all of the parts needed to assemble a particular product are present in the kit; a missing part stands out because each kit should always have the same set of components.

As an alternative to progressive-build manufacturing systems which are often faced with the problem of large dwell times, i.e. time periods where a product being assembled must wait before moving to a subsequent assembly stage, some manufacturing systems have been shifted to continuous flow manufacturing (CFM) methods. In general, CFM methods employ a demand-driven pull system for inventory control and movement of components into the assembly process. This can include the use of kanban techniques for inventory control and movement. CFM also supports mixed-model manufacturing continuous flow production lines. CFM systems offer continuous flow of value added activities, eliminating wasted motion and dwell times. Other terms often used for CFM include Just-In-Time (JIT) manufacturing, Flexible and Agile Manufacturing, Synchronous Manufacturing and Demand Based Conversion.

Personal computers, servers, workstations, portables, embedded systems and other computer systems are typically assembled in manufacturing systems designed for build-to-stock environments. A typical personal computer system includes a processor, associated memory and control logic and a number of peripheral devices that provide input and output (I/O) for the system. Such peripheral devices include, for example, compact disk read-only memory (CD-ROM) drives, hard disk drives, floppy disk drives, and other mass storage devices such as tape drives, compact disk recordable (CD-R) drives or digital video/versatile disk (DVD) drives.

Manufacturing computer systems becomes inefficient when the number of identical units is decreased and process steps are changed as orders change, both of which are characteristics of a build-to-order environment where computer systems (or products generally) are manufactured or assembled only after an order for that particular computer system has been placed. As a result, the conventional manufacturing systems do not adapt well to the build-to-order environment and can limit the ability to fill small orders, require extra inventory, generate more work-in-process, and be globally constrained by the slowest process step. This process also requires line changeovers and new tooling when change is required. One attempt to adapt and to improve the efficiency of conventional manufacturing systems has been to reduce the number of components prepared in advance of orders. By limiting such in-process inventory, the line can change configurations more easily as orders change. However, this scheme is still limited in its efficiency for smaller orders in the build-to-order environment.

Because computer systems manufacturers have recognized that a build-to-order environment is advantageous and often can better react to the speed with which product designs and customer expectations change, there is a need to provide manufacturing systems and methods that more efficiently integrate with the build-to-order model while ensuring that high quality, defect free products are produced.

SUMMARY OF THE INVENTION

It has been discovered that parallel organized unit-by-unit manufacturing and assembly systems and methods for computer systems and other products advantageously integrate into a build-to-order environment. Responsive to orders received, kit trays are prepared that each hold the components needed to build an ordered product. The kit tray is transferred to a work cell where a team builds the product. The product is then tested and repaired, with information regarding any problems provided to the responsible work cell.

Accordingly, one aspect of the present invention provides a build-to-order product assembly system including a control unit, a kitting unit, and an assembly unit. The control unit is capable of receiving a product order describing a product to be assembled. The control unit includes a list of product components for the product to be assembled. The kitting unit is coupled to the control unit and receives the list of product components. The kitting unit includes a plurality of kit trays, a plurality of stored product components, and a product component list display device. The product component list display device displays the list of product components so that a kit tray with product components pulled from the stored product components and according to the product component list display device can be prepared. The assembly unit is coupled to the kitting unit and receives the prepared kit tray from the kitting unit. The assembly unit has a first work cell including a work space for assembly of the product using the product components from the prepared kit tray.

In another aspect of the invention, a manufacturing system for assembly of computer systems in a build-to-order environment is disclosed. The system includes a kitting unit housing kit trays and computer system components. A list of components for assembling an ordered computer system is received by the kitting unit. The list of components is displayed to at least one kitting operator to allow respective kit trays to be prepared with computer system components for the ordered computer system by pulling selected computer system components from those housed at the kitting unit. The system also includes an assembly unit constructed to receive prepared kit trays from the kitting unit. The assembly unit has a plurality of work cells operable in parallel. At least one work cell provides work space and tools to allow a team of work cell operators to assemble an ordered computer system using the computer system components from a prepared kit tray. Also, the work cell provides an integrated quick test, shared by at least one other work cell, to allow a quick test operator to test the assembled computer system for basic functionality. The system also includes an extended test unit constructed to receive assembled computer systems from the work cells. The extended test unit provides work space and tools to allow at least one extended test operator to quality test assembled computer systems.

In still another aspect of the invention, a method of assembling a build-to-order product is disclosed. A list of components for assembling an ordered product is received and displayed. A kit tray including product components is prepared. The prepared kit tray is transferred to an assembly unit operable to receive prepared kit trays. The ordered product is assembled in the assembly unit using the product components from the prepared kit.

In yet another aspect of the invention, a build-to-order computer system includes a chassis, a processor supported by the chassis, and a memory coupled to the processor. The build-to-order computer system is assembled by a method of assembling a build-to-order computer system including (1) receiving and displaying a list of components for assembling the build-to-order computer system; (2) preparing a kit tray including build-to-order computer system components; (3) transferring the prepared kit tray to an assembly unit operable to receive prepared kit trays; and (4) assembling the ordered product in the available work cell using the build-to-order computer system components from the prepared kit.

In yet another aspect of the invention, a build-to-order product assembly system includes a kitting unit, an assembly unit, and at least one of a quick test cell and an extended test unit. The kitting unit receives a list of product components. The kitting unit includes a plurality of kit trays, a plurality of stored product components, and a product component list display device. The product component list display device displays the list of product components so that a kit tray with product components pulled from the stored product components and according to the product component list display device can be prepared. The assembly unit is coupled to the kitting unit and receives the prepared kit tray from the kitting unit. The assembly unit has a first work cell including a work space for assembly of a product using the product components from the prepared kit tray. The quick test cell is coupled to the first work cell and is operable to receive the assembled product and perform a test of basic functionality of the assembled product. The extended test unit is coupled to the assembly unit and is operable to receive the assembled product from the assembly unit and perform a quality test of the assembled product. The quick test cell and the extended test unit are operable to provide information about failure of the respective test to the first work cell.

In still another aspect of the invention, a build-to-order product assembly system includes a kitting unit, and an assembly unit. The kitting unit receives a first list of product components and a second list of product components. The kitting unit includes a plurality of kit trays, a plurality of stored product components, a first product component list display device, and a second product component list display device. The first product component list display device displays the first list of product components so that a first kit tray with product components pulled from the stored product components and according to the first product component list display device can be prepared. The second product component list display device displays the second list of product components so that a second kit tray with product components pulled from the stored product components and according to the second product component list display device can be prepared. The product components of the first prepared kit tray have at least one difference with the product components of the second prepared kit tray. The assembly unit is coupled to the kitting unit. The assembly unit is operable to receive the first and the second prepared kit trays from the kitting unit and has a work cell including a work space for assembly of a product using the product components from one of the first and second prepared kit trays. Assembly begins when all of the components for the product are in the one of the first and second prepared kit tray.

In still another aspect of the invention, a build-to-order product assembly system includes a kitting unit and an assembly unit. The kitting unit receives a list of product components. The kitting unit includes a plurality of kit trays, a plurality of stored product components, and a product component list display device. The product component list display device displays the list of product components so that a kit tray with product components pulled from the stored product components and according to the product component list display device can be prepared. The assembly unit is coupled to the kitting unit and receives the prepared kit tray from the kitting unit. The assembly unit has a first work cell including a work space for assembly of a product using the product components from the prepared kit tray. The assembly occurs in an order and with a number of steps reducing damage to the product components.

In still another aspect of the invention, a build-to-order product assembly system includes a kitting unit and an assembly unit. The kitting unit receives a list of product components. The kitting unit includes a plurality of kit trays, a plurality of stored product components, and a product component list display device. At least one of the kit trays includes a plurality of component retaining features. The component retaining features are operable to reduce impact to product components stored therein from kitting tray movement. The product component list display device displays the list of product components so that a kit tray with product components pulled from the stored product components and according to the product component list display device can be prepared. The assembly unit is coupled to the kitting unit and receives the prepared kit tray from the kitting unit. The assembly unit has a first work cell including a work space for assembly of a product using the product components from the prepared kit tray. The assembly occurs in an order and with a number of steps reducing damage to the product components.

The systems and methods advantageously provide that a kit tray is not prepared and assembly does not begin until an order is received. After an order is received, the kit tray is prepared with all of the components needed to assemble the ordered product. In this respect, the kitting stage is both pulled and order-driven. Additionally, each prepared kit tray is transferred to a work cell where one operator or a team of operators assemble the ordered computer system. Assembly of the computer system does not begin until all components are available in the work cell. The team is enabled to perform a quick test of basic functionality as an integrated part of the assembly process. If there are any problems, the team is directly accountable and can quickly receive feedback. Higher production speed, greater ease of reconfiguration, fewer touches of components, fewer and more localized work stoppages and a more efficient handling of small orders are additional advantages.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
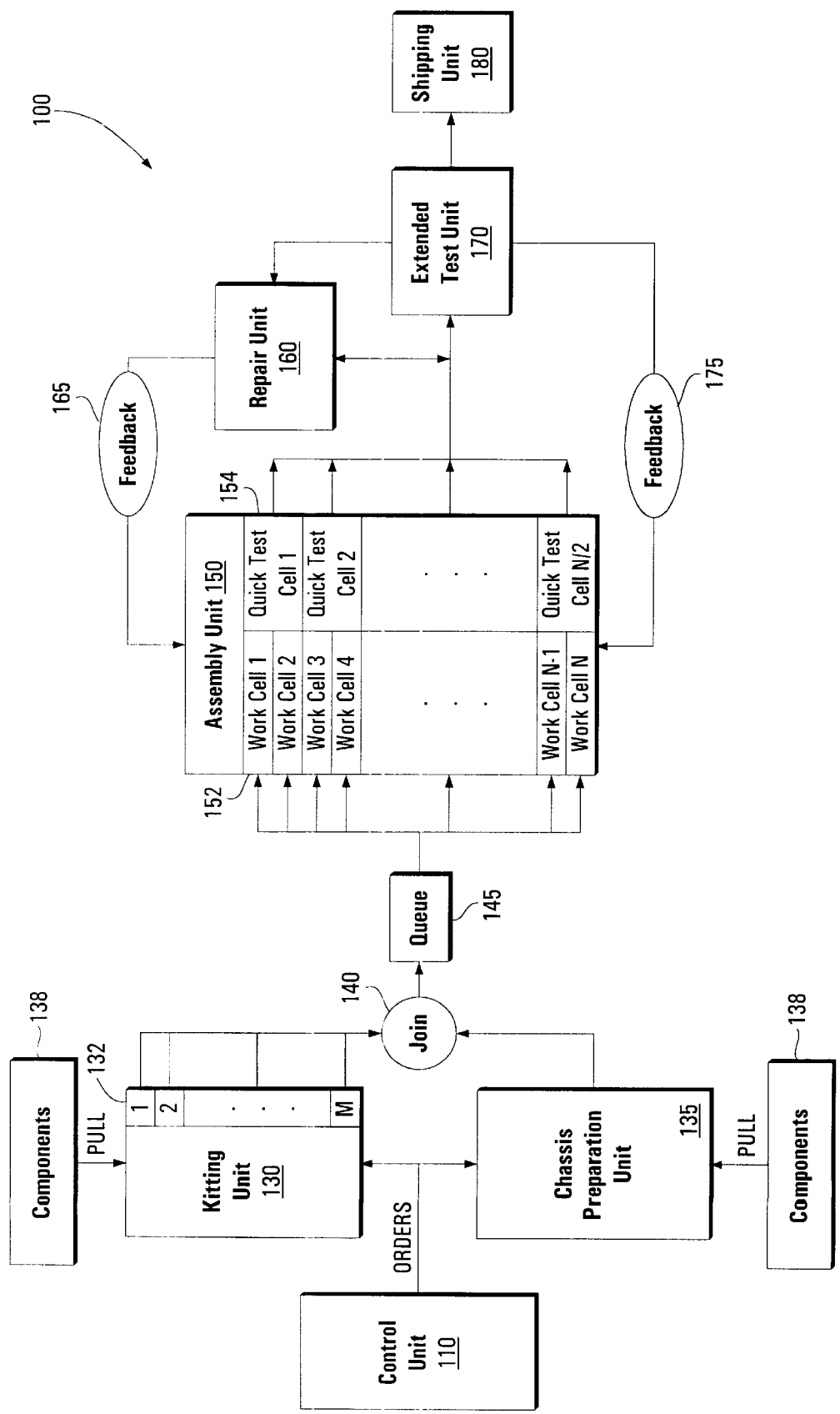
FIG. 1 is a block diagram of a manufacturing/assembly system for producing computer systems (and products generally) in a build-to-order fashion.

FIG. 1 schematically illustrates a manufacturing or assembly system 100 for producing a variety of products, and computer systems in particular, in a build-to-order fashion. The system is controlled by control unit 110 which provides computer system orders, order information, and/or component lists derived from computer system orders to kitting unit 130 and chassis preparation unit 135. Although not shown, control unit 110 can also provide order related information to any and all of the elements of the system, as needed. Control unit 110 is best implemented as a computer system that integrates with or includes an order taking system. As will be seen below, control system 110 can also provide indirect and direct control of various system units. Instead of, or in addition to control unit 110, each of the units of system 100 can have local control subject to communication among some or all of the units. For example, kitting stage 130 could receive order information directly from an order taking system, thereby obviating the need for control unit 110, and directly pass information on to other units as needed.

Figures 2, 3, 6:
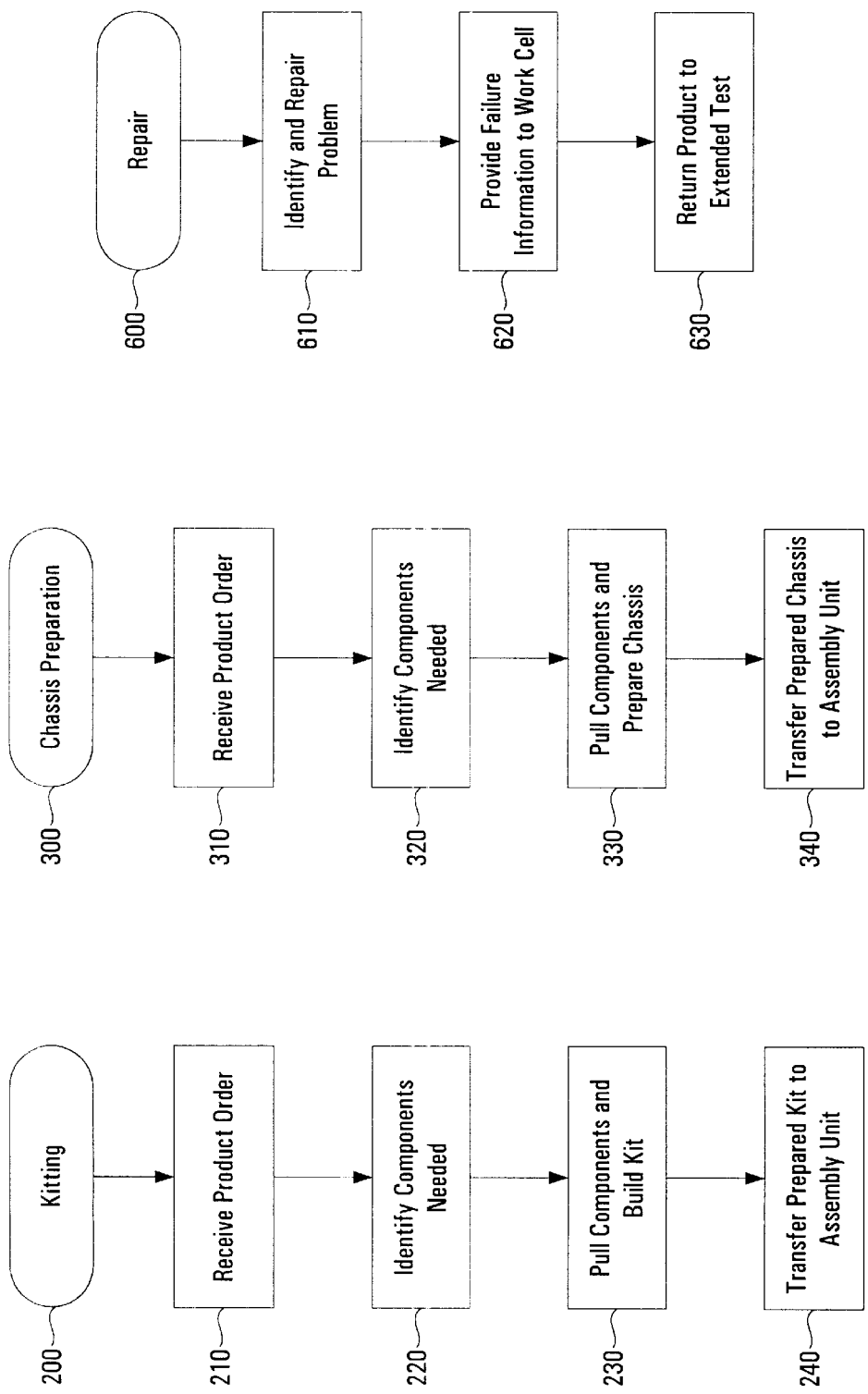
FIG. 2 is a flow chart illustrating a kitting process.
FIG. 3 is a flow chart illustrating a chassis preparation process.
FIG. 6 is a flow chart illustrating a repair process.

FIG. 2 illustrates the kitting 200. In step 210, kitting unit 130 receives product order information. Components needed for assembly are identified in 220. Next, the components are pulled to build a kit. Once prepared, the kit is transferred to the assembly unit 150 as shown in step 240.

Referring again to FIG. 1, kitting unit 130 receives computer system components from component source 138, which may be a warehouse, a truck delivering components just in time, or the like. Components are stored in kitting unit 130 so that they are accessible for pulling. Kitting unit 130 also includes kit trays designed to accommodate all or substantially all of the components required to fill an order for a computer system. Thus, the kit trays can include various compartments and features built into the tray such as a lip to support a chassis on top of the tray. Additionally, kit trays can be manufactured from or can include soft materials such as foam so as to protect computer system components that are pulled and placed into the kits. Kitting trays can be designed to provide better protection for computer system components than is provided by the chassis in which the component is ultimately installed. Protecting the components contributes to the production of high quality, low defect computer systems. Kitting unit 130 also includes kitting stages 132, each having some or all of the components needed to prepare a kit tray for a particular computer system order. Thus, each stage may be responsible for pulling all of the components for a given order, or components can be pulled from one or more of the different stages (i.e. progressively building the kits), thereby filling out the kit tray.

The list of components needed for an ordered computer system is provided to a component list display device, the component list display device, in turn, displays the list of computer system components to a kitting unit operator. The component list display device can be, for example, a piece of paper listing the needed components, a computer system screen displaying the needed components, or a pick-to-lights system integrated with the storage for components (e.g. shelving) in the kitting stages. In the case of a pick-to-lights system, control unit 110 can supply component list information directly to the pick-to-lights system. For example, an operator can assign a bar code to a specific kit tray (or alternatively each tray can have a permanent bar code assigned to it). When the operator scans the bar code, a specific order is assigned to that bar code and the pick-to-lights system proceeds to indicate to the operator which components to pick by lighting an indicator at each pick location for each needed component, in succession. With each pick, the pick-to-lights system waits for pick confirmation by the operator (e.g. the operator presses a button), and once received, proceeds to indicate the next item to be picked. In this manner, all of the components for an ordered computer system are pulled and placed in a kit tray, thus preparing the tray for transfer to assembly unit 150 using, for example, a conveyor.

Although all of the components for an ordered computer system can be provided to assembly unit 150 by kitting unit 130, it is also desirable, in some circumstances, to include chassis preparation unit 135 as part of system 100. Chassis preparation 300, as illustrated in FIG. 3, begins with step 310 where chassis preparation unit 135 receives product order information. Components needed for assembly are identified in 320. Next, the components are pulled and a chassis is prepared. It should be noted that chassis preparation unit 135 and chassis preparation 300 can include preparation and/or installation of additional components such as the computer system motherboard. Chassis preparation unit 135 and chassis preparation 300 are particularly suited to preparation of components that require special handling (e.g. a motherboard, a processor, and memory), require extra time for setup (e.g. installing the flash memory BIOS for the computer system), that vary little from order to order (e.g. a power supply), or that can be installed in such a manner that the component will not interfere with or complicate the installation of subsequent components. Once prepared, the chassis is transferred to the assembly unit 150 as shown in step 340.

Control unit 110 can operate to coordinate the delivery of information to both the kitting unit and the chassis preparation unit so that a prepared kit tray for a particular order and its corresponding prepared chassis are ready for assembly unit 150 at approximately the same time. Alternatively, either kitting unit 130 or chassis preparation unit 135 can control when the other unit's process begins or signal when the other unit's process should begin so that both the prepared kit tray and its corresponding prepared chassis are ready at approximately the same time. Order fulfillment information can flow by means of a traveler which can be in a paper format and an electronic format. When both the prepared chassis and the prepared kit tray are ready, the prepared chassis is added to the prepared kit tray, by, for example, placing the chassis on the lip of the kit tray, before being sent to the assembly unit. This is accomplished in joining area 140 which is coupled to both kitting unit 130 and chassis preparation unit 135 by conveyor lines or other appropriate devices. Note that as between various system elements such as joining area 140 and kitting unit 130 coupling encompasses both physical coupling such as a conveyor, and systematic association such as a path to transfer items from one unit to the other. Additionally, joining area 140 can include a scanner to confirm that a particular kit tray and a particular chassis belong together. The joining process can be performed automatically by machine, manually by an operator, or by some combination of the two.

Figure 4:
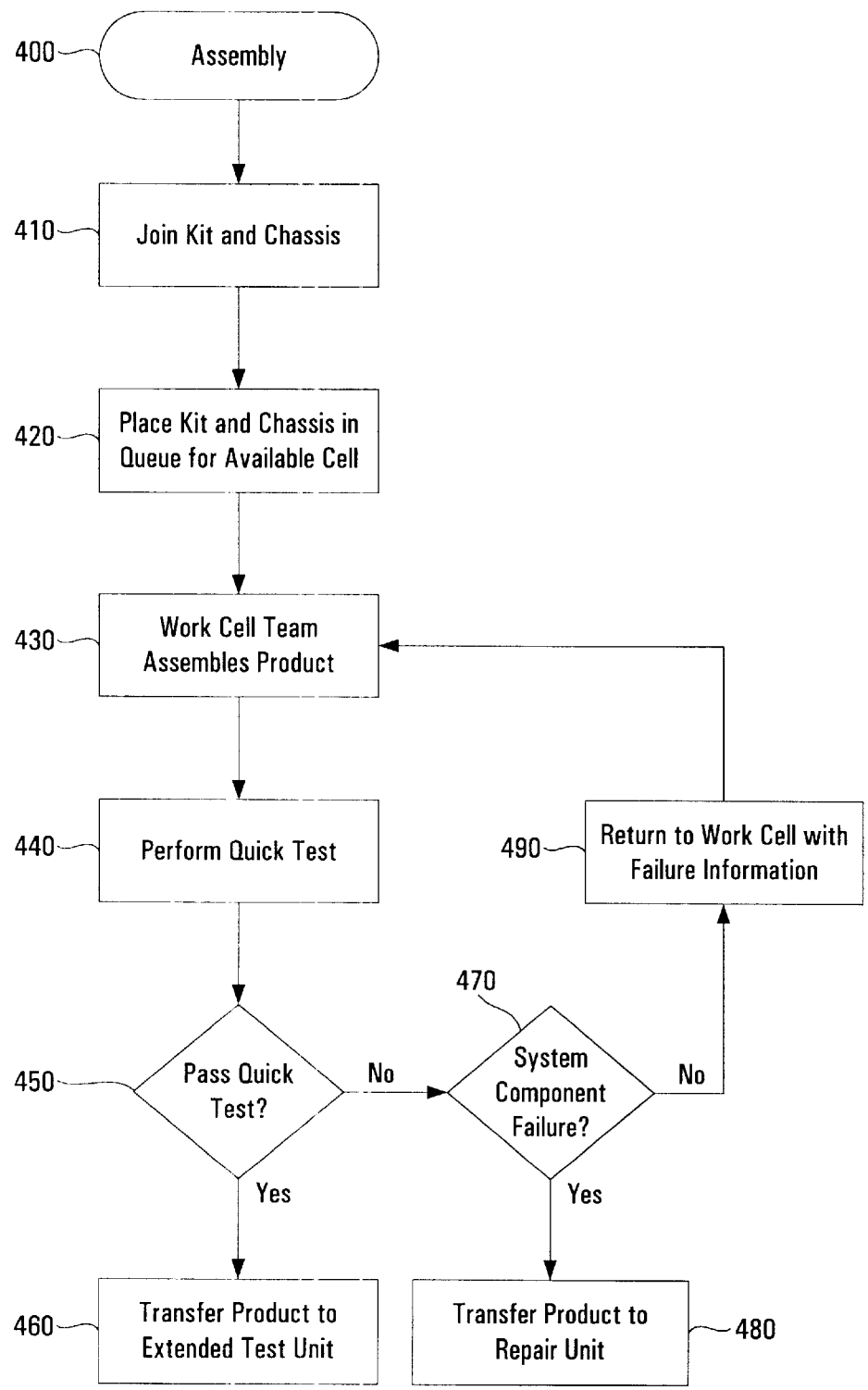
FIG. 4 is a flow chart illustrating assembly and quick testing.

FIG. 4 is a flow chart of the assembly process 400. In step 410, a prepared kit tray is joined with the appropriate prepared chassis, as previously described in relation to joining area 140. Next, in step 420, the kit and chassis are placed in a queue 145 where they await an available work cell 152 in assembly unit 150. A variety of different queuing schemes may be implemented depending on the requirements of assembly unit 150 and the physical layout of system 100. For example, a single queue 145 (as shown) may support all of the work cells of the assembly unit. Alternatively, there can be multiple queues, each supporting one or more work cells. The number of joined prepared chassis and prepared kit trays in a queue is also variable depending upon the needs of the system. Step 430 indicates that once a work cell is available, the work cell operator or team for that cell assembles the computer system. A work cell team includes two or more operators to assemble the computer system. In item 440, a quick test of basic computer system functionality is performed. Additionally, to eliminate wait time by an operator or team and to optimize the assembly process, a queue can be designed to operate on a first in first out (FIFO) basis.

Multiple kits can be prepared simultaneously in kitting unit 130 and multiple computer systems can be assembled simultaneously if there are multiple work cells. Consequently, system 100 is able to produce multiple computer systems in parallel, in contrast to progressive-build systems which produce a single completed computer system at a time.

As seen in FIG. 1, assembly unit 150 includes a quick test cell 154. Quick test cell 154 can be combined with work cell 152, quick test cell 154 can be associated with a single work cell, or as shown, quick test cell 154 can be shared by two or more work cells. Item 450 indicates that if the computer system passes the quick test, the process proceeds to item 460 where the computer system is transferred to an extended test unit 170. If the computer system fails the quick test in item 450, item 470 determines if the failure is a system component failure, for example a motherboard failure. The cause of the failure is identified by a decision matrix. Item 490 shows that computer system failures that are not system component failures (e.g. the failure is caused by an operator error) cause the computer system to be returned to the work cell that built the computer system. Information about the failure is also given to the work cell. Alternatively the work cell operator is called to the quick test cell to provide feedback. In this manner, immediate feedback is provided to the work cell operator or team and the problem can be remedied efficiently. Moreover, the quick feedback helps the operator or team learn from their mistakes, thereby becoming more productive and giving the operator or team greater ownership of the process. This also provides a learning environment which improves workmanship and improves quality. As indicated in item 480, if the computer system failure in the quick test is caused by a system component failure, the computer system is transferred to a repair unit 160.

Work cell 152 is designed so that all or substantially all of the computer system assembly is performed there. The work cell includes a work space and any tools needed to assemble the computer system. Conveyors lead from kitting unit 130 and from chassis preparation unit 135 to the work cell so that the kit tray is quickly and easily transferred. Assembly of the computer system may not begin unless all of the computer system components needed for the computer system are in the kit tray. If a component is defective, a work cell operator obtains a replacement component, either directly or by requesting that another operator obtain the component. Because assembly unit 150 does not operate in a progressive build manner, the kit with the defective component can be set aside until the replacement component is obtained, and another computer system can be assembled from another kit (taken from the queue) in the interim.

Where the work cell has a team of two operators, one operator prepares a component for assembly while the other operator is installing a different component. Operators alternate installing and preparing components until the computer system is completed. In addition to general assembly training provided to operators, assembly instructions specific to the computer system being assembled can accompany the computer system components in the kit tray, or can be provided directly to the work cell by, for example, interactive electronic work instructions. With electronic work instructions, a computer in the work cell can display instructions including detailed figures as determined by the information associated with the ordered computer system and its kit tray. Assembly steps generally, and electronic work instructions in particular, are designed to reduce or minimize the number of components that must be handled by an operator and the number of times that any one component must be handled. Thus, by reducing the number of "touches," a computer system is less likely to be damaged or erroneously assembled, lead times are reduced, and throughput is increased.

As noted above, the quick test cell 154 can be part of work cell 152 and consequently the operator of the quick test cell and the work cell may be the same operator. For example, a computer system that is particularly complicated or specialized may better be assembled by a single operator (as opposed to a team). In such a case, that work cell can include the quick test cell so that the operator initiates the quick test on an assembled computer system and then begins to assemble another system while the quick test is being performed. Those having ordinary skill in the art will readily recognize that a variety of combinations of quick test cells, work cells, and associated operators can be implemented in the present manufacturing and assembly methods and systems.

Figure 5:
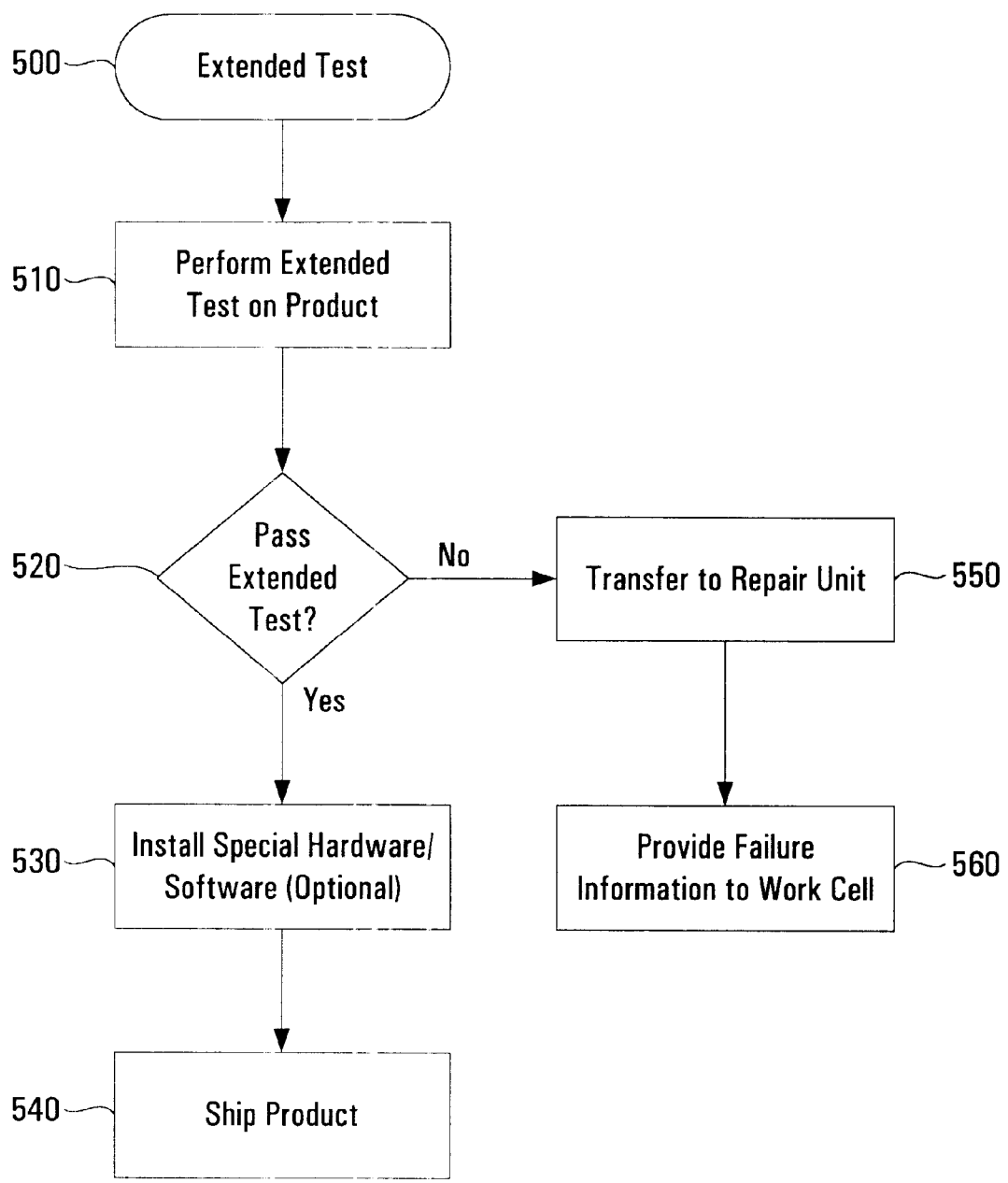
FIG. 5 is a flow chart illustrating an extended test.

FIG. 5 describes the extended test 500. In item 510, the extended test is performed on the computer system. This process entails transferring the assembled computer system to a burn-in rack where the computer system is connected to a network and detailed testing of the computer system's quality is performed. To make transferring the assembled computer system from assembly unit 150 to extended test unit 170 more efficient, a stacker can be used to stack several computer systems for loading on to a cart. The cart is then transferred to extended test unit 170 for insertion of the computer systems to be tested.

Item 520 determines if the computer system has passed the extended test. If not, the computer system is transferred to repair unit 160 as shown in step 550. Additionally, item 560 shows that information about the failure can be provided by the extended test unit to the work cell responsible for assembling the computer system. Such information can also be provided to the work cell by repair unit 160. If the computer system passes the extended test, additional installation steps can be performed such as those indicated by item 530. For example, software that was ordered for the computer system can be installed while the computer system is still connected to the network from which the extended test is performed. Finally, the computer system proceeds to item 540 where the computer system is shipped. As indicated by FIG. 1, shipping occurs in shipping unit 180. Shipping unit 180 can include a variety of steps such as final preparation (e.g. wipe-down and labeling), bundling with other ordered items, and packaging.

Extended test unit 170 is controlled by a smart burn-in monitoring system designed to eliminate wasted effort in the extended test process. For example, the smart burn-in monitoring system displays a screen indicating each of the positions in extended test unit 170 in which a computer system is or can be placed. Status information such as which computer systems have failed the extended test, which computer systems have completed the extended test, which levels of the extended test have been completed, and which positions in the extended test unit are vacant is displayed.

FIG. 6 illustrates the repair process 600 as performed in repair unit 160. Item 610 indicates that the computer system's problem is identified and repaired. Because a computer system can be sent to repair unit 160 from either a quick test cell or the extended test unit, repair unit 160 may receive information from either of those sources to assist in problem diagnosis and repair. Once the problem has been identified and repaired, feedback in the form of information about the failure is provided to the work cell responsible for the computer system, as shown in item 620. In step 630, the computer system is sent to extended test unit 170 (for the first time in the case of a computer system failed to the repair unit from a quick test cell).

Those of ordinary skill in the art will readily recognize that the manufacturing systems and methods described above can be implemented when building a variety of different products, and not just computer systems.

The description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. A build-to-order product assembly system comprising:
    a control unit capable of receiving a product order describing a product to be assembled, the control unit including a list of product components for the product to be assembled, wherein the product is a computer system including a chassis, a processor supported by the chassis and a memory coupled to the processor;
    a kitting unit coupled to the control unit and receiving the list of product components, the kitting unit including:
        a plurality of kit trays;
        a plurality of stored product components; and
        a product component list display device, the product component list display device displaying the list of product components so that a kit tray with product components pulled from the stored product components and according to the product component list display device can be prepared;
    an assembly unit coupled to the kitting unit and receiving the prepared kit tray from the kitting unit, the assembly unit having a first work cell including a work space for assembly of the product using the product components from the prepared kit tray;
    a chassis preparation unit coupled to the control unit and receiving the list of product components, the chassis preparation unit including:
        a plurality of chassis components; and
        a chassis preparation work space in which a chassis is prepared for a computer system according to the list of product components; and
    a joining area coupled to the kitting unit and to the chassis preparation unit, the joining area receiving a prepared chassis and a prepared kit tray the prepared chassis being added to the prepared kit tray before being sent to the assembly unit, wherein the control unit delivers the list of product components to the chassis preparation unit at a first time, and the control unit delivers the list of product components to the kitting unit at a second time, the first time and the second time being selected by the control unit so the prepared chassis and the prepared kit tray arrive at the joining area at approximately the same time.

2. The build-to-order product assembly system of claim 1 wherein each of the plurality of kit trays includes:
    a plurality of foam-lined tray compartments to accommodate the product components; and
    a lip to support the chassis on top of the tray.

3. The build-to-order product assembly system of claim 1 further comprising an extended test unit coupled to the assembly unit, the extended test unit receiving an assembled computer system from the assembly unit and including a plurality of extended test positions for quality testing the computer system.

4. The build-to-order product assembly system of claim 3 wherein the plurality of extended test positions are controlled and monitored by a smart burn-in monitoring system including a test status indicator providing test information about a computer system in a test position.

5. The build-to-order product assembly system of claim 4 wherein the smart burn-in monitoring system includes information about a computer system that fails a test in the extended test unit, the information being supplied to the first work cell.

6. The build-to-order product assembly system of claim 4 further comprising a repair unit including a repair work space, a computer system that fails a test in the extended test unit being received by the repair unit from the extended test unit, the repair unit being capable of supplying information about the computer system that fails a test to the first work cell.

7. The build-to-order product assembly system of claim 1 wherein the assembly unit includes a quick test cell coupled to the first work cell and operable to receive the assembled product, the quick test cell including a quick test work space for testing of basic functionality of the assembled product and providing at least one of information about failure of the test of basic functionality and the assembled product to the first work cell when the assembled product fails the test of basic functionality.

8. The build-to-order product assembly system of claim 7 wherein the first work cell includes the quick test cell.

9. The build-to-order product assembly system of claim 7 wherein the assembly unit further comprises:
   a second work cell coupled to the quick test cell and including a work space allowing a second work cell to assemble the product using the product components from the prepared kit tray, the quick test cell being shared by the first work cell and the second work cell; and
   a queue operable to accumulate at least one prepared kit tray and provide the prepared kit tray to one of the first work cell and the second work cell.

10. The build-to-order product assembly system of claim 1 wherein the first work cell includes a first operator and a second operator, the first operator installing a first one of the product components into the product while the second operator prepares a second product component for installation into the product.

11. The build-to-order product assembly system of claim 1 wherein the first work cell includes an electronic work instruction display operable to receive information about the product to be assembled and to display instructions about the product to be assembled.

12. The build-to-order product assembly system of claim 11 wherein the electronic work instruction display is coupled to the control unit and receives the information about the product to be assembled from at least one of the control unit and the prepared kit tray.

13. The build-to-order product assembly system of claim 1 wherein the product component list display device is one of a pick-to-lights system and a component display screen.

14. The build-to-order product assembly system of claim 1 wherein the kitting unit is coupled to the assembly unit by a conveyor.

15. A manufacturing system for assembly of computer system in a build-to-order environment comprising:
   a kitting unit housing kit trays and computer system components, the kitting unit:
      including a code for generating a signal to indicate a list of components for assembling an ordered computer system; and
      displaying the list of components in a pick-to-lights system to at least one kitting operator to allow respective kit trays to be prepared with computer system components for the ordered computer system by pulling selected computer system components from those housed at the kitting unit;
   an assembly unit constructed to receive prepared kit trays from the kitting unit, the assembly unit having a plurality of work cells operable in parallel, at least one work cell:
      providing work space and tools to allow a team of work cell operators to assemble an ordered computer system using the computer system components from a prepared kit tray; and
      providing an integrated quick test, shared by at least one other work cell, to allow a quick test operator to test the assembled computer system for basic functionality; and
   an extended test unit constructed to receive assembled computer system from the work cells, the extended test unit providing work space and tools to allow at least one extended test operator to quality test assembled computer systems.

16. The manufacturing system for assembly of computer systems in a build-to-order environment of claim 15 further comprising:
   a chassis preparation unit:
      receiving a list of chassis and motherboard components for assembling the ordered computer system, and
      displaying the list of chassis and motherboard components to at least one chassis preparation operator for pulling chassis and motherboard components from chassis and motherboard components housed at the chassis preparation unit;
      preparing the chassis by assembling the chassis and motherboard components for the ordered computer system; and
   a joining unit operable to receive prepared chassis and prepared kit trays, the joining unit:
      identifying corresponding prepared kit trays and prepared chassis; and
      placing a prepared chassis on the corresponding prepared kit tray before the prepared kit tray is sent to the assembly unit.

17. The manufacturing system for assembly of computer systems in a build-to-order environment of claim 15 wherein the motherboard components include a motherboard and at least one of a processor and a memory.

18. The manufacturing system for assembly of computer systems in a build-to-order environment of claim 15 further comprising a queue operable to accumulate prepared kit trays and provide them to one of the plurality of work cells.

19. The manufacturing system for assembly of computer systems in a build-to-order environment of claim 15 wherein the quick test operator provides at least one of: (1) information about failure of the test of basic functionality, and (2) an assembled computer system to the work cell that assembled the computer system when the computer system fails the test of basic functionality.

20. The manufacturing system for assembly of computer systems in a build-to-order environment of claim 15 wherein ones of the plurality of work cells includes an electronic work instruction display operable to receive information about the computer system to be assembled and to display instructions about the computer system to be assembled.

21. The manufacturing system for assembly of computer systems in a build-to-order environment of claim 15 further comprising a repair unit:
   receiving a computer system that fails a test in the extended test unit;
   repairing the computer system; and
   supplying information about the computer system that fails the test to the work cell that assembled the computer system.

22. A method of assembling a build-to-order product comprising:

receiving and display a list of components for assembling an ordered product;

providing a kit tray;

coding the kit tray;

generating a signal from the coded kit tray to indicated a list of product components;

identifying the product components from the list in a pick-to-lights system;

selecting the identified product components;

placing the product components in the kit tray;

transferring the prepared kit tray to an assembly unit operable to receive prepared kit trays; and assembling the ordered product in the assembly unit using the product components from the prepared kit.

23. The method of claim 22 wherein the assembly unit includes a plurality of work cells operable in parallel, the method further comprising routing prepared kit trays to one of the work cells; and wherein preparing the kit tray includes:

pulling components from a plurality of stored components and according to the list of components for assembling an ordered product; and placing pulled components in the kit tray.

24. The method of claim 23 further comprising:

routing a prepared kit tray to an available work cell;

testing the assembled product for basic functionality in a quick test cell associated with the work cell;

transferring the assembled product to an extended test unit operable to receive assembled products; and performing a quality test on assembled products in the extended test unit.

25. The method of claim 22 wherein the ordered product is a computer system including a chassis, a processor supported by the chassis, and a memory coupled to the processor.

26. The method of claim 25 further comprising:

preparing a chassis for the ordered computer system;

transferring the prepared chassis to the assembly unit; and joining the prepared chassis to a corresponding prepared kit tray prior to assembling the ordered product.

27. The method of claim 26 wherein the preparing the kit tray and the preparing the chassis occur in parallel.

28. The method of claim 22 further comprising queuing at least one prepared kit tray prior to the routing.

29. The method of claim 22 further comprising returning the assembled product to the work cell where the assembled product was assembled when the assembled product fails a basic functionality test.

30. The method of claim 22 further comprising repairing, in a repair unit, an assembled product that fails the extended test.

31. The method of claim 22 further comprising providing information about the failure of the assembled product to the work cell where the assembled product was assembled.

32. The method of claim 22 wherein the available work cell includes the quick test cell, and wherein the assembling the ordered product and the testing the assembled product are performed by an operator.

33. A build-to-order computer system comprising:

a chassis;

a processor support by the chassis; and a memory coupled to the processor, the computer system assembled by:

receiving and displaying a list of components for assembling the build-to-order computer system;

providing a kit tray;

coding the kit tray;

generating a signal from the coded kit tray to indicate a list of product components;

identifying the product components from the list in a pick-to-lights system;

selecting the identified product components;

placing the product components in the kit tray;

transferring the prepared kit tray to an assembly unit operable to receive prepared kit trays; and assembling the ordered product in the available work cell using the build-to-order computer system components from the prepared kit.

34. A build-to-order product assembly system comprising:

a kitting unit receiving a list of product components, the kitting unit including:

a plurality of coded kit trays;

a plurality of stored product components; and a product component list display device including a pick-to-lights system actuated by the coded kit trays, the product component list display device displaying the list of product components so that a kit tray with product components pulled from the stored product components and according to the product component list display device can be prepared;

an assembly unit coupled to the kitting unit and receiving the prepared kit tray from the kitting unit, the assembly unit having a first work cell including a work space for assembly of a product using the product components from the prepared kit tray;

at least one of:

a quick test cell coupled to the first work cell, the quick test cell operable to receive the assembled product and perform a test of basic functionality of the assembled product; and an extended test unit coupled to the assembly unit, the extended test unit operable to receive the assembled product from the assembly unit and perform a quality test of the assembled product; and the at least one of a quick test cell and an extended test unit operable to provide information about failure of the respective test to the first work cell.

35. The build-to-order product assembly system of claim 34 wherein the information is used by the first work cell during a subsequent assembly of a product.

36. The build-to-order product assembly system of claim 34 wherein the information is used by the first work cell to repair the assembled product.

37. The build-to-order product assembly system of claim 34 further comprising a repair unit operable to receive an assembled product that fails a test in the at least one of a quick test cell and an extended test unit, and operable to provide additional information about failure of the respective test to the first work cell.

38. The build-to-order product assembly system of claim 34 wherein the assembled product is a computer system including a chassis, a processor supported by the chassis, and a memory coupled to the processor.

39. A build-to-order product assembly system comprising:

a kitting unit receiving a first list of product components and a second list of product components, the kitting unit including:

a plurality of kit trays;

a plurality of stored product components;

a first product component list display device, the first product component list display device displaying the first list of product components so that a first kit tray with product components pulled from the stored product components and according to the first product component list display device can be prepared; and a second product component list display device, the second product component list display device displaying the second list of product components so that a second kit tray with product components pulled from the stored product components and according to the second product component list display device can be prepared;

the product components of the first prepared kit tray having at least one difference with the product components of the second prepared kit tray; and an assembly unit coupled to the kitting unit, the assembly unit operable to receive the first and the second prepared kit trays from the kitting unit, the assembly unit having a work cell including a work space for assembly of a product using the product components from one of the first and second prepared kit trays, assembly beginning when all of the components for the product are in the one of the first and second prepared kit tray, wherein all of the assembly of the product using the product components from one of the first and second prepared kit trays occurs in the assembly unit.

40. The build-to-order product assembly system of claim 39 wherein the assembled product is a computer system including a chassis, a processor supported by the chassis, and a memory coupled to the processor.

41. The build-to-order product assembly system of claim 40 further comprising:

a chassis preparation unit receiving the first list of product components, the chassis preparation unit including:

a plurality of chassis components; and a chassis preparation work space in which a chassis is prepared for a computer system according to the first list of product components; and a joining area coupled to the kitting unit and to the chassis preparation unit, the joining area receiving a prepared chassis and the first prepared kit tray, the prepared chassis being added to the first prepared kit tray before being sent to the assembly unit.

42. The build-to-order product assembly system of claim 39 wherein the first product component list display device and the second product component list display device are the same device.

43. The build-to-order product assembly system of claim 39 further comprising at least one of:

a quick test cell coupled to the work cell, the quick test cell operable to receive the assembled product and perform a test of basic functionality of the assembled product; and an extended test unit coupled to the assembly unit, the extended test unit operable to receive the assembled product from the assembly unit and perform a quality test of the assembled product;

the at least one of a quick test cell and an extended test unit operable to provide information about failure of the respective test to the work cell.

44. A build-to-order product assembly system comprising:

a kitting unit receiving a list of product components, the kitting unit receiving a list of product components, the kitting unit including:

a plurality of coded kit trays;

a plurality of stored product components; and a product component list display device including a pick-to-lights system actuated by the coded kit trays, the product component list display device displaying the list of product components so that a kit tray with product components pulled from the stored product components and according to the product component list display device can be prepared; and an assembly unit coupled to the kitting unit and receiving the prepared kit tray from the kitting unit, the assembly unit having a first work cell including a work space for assembly of a product using the product components from the prepared kit tray, the assembly occurring in an order and with a number of steps reducing damage to the product components.

45. The build-to-order product assembly system of claim 44 wherein the first work cell includes an electronic work instruction display operable to receive information about the product to be assembled and to display instructions about the product to be assembled, the instructions including assembly steps ordered to reduce damage to the product components.

46. The build-to-order product assembly system of claim 44 wherein damage to product components is reduced by reducing the number of times components are touched by an operator.

47. The build-to-order product assembly system of claim 44 wherein the assembled product is a computer system including a chassis, a processor supported by the chassis, and a memory coupled to the processor.

48. A build-to-order product assembly system comprising:

a kitting unit receiving a list of product components, the kitting unit including:

a plurality of coded kit trays, at least one of the kit trays including a plurality of component retaining features, the component retaining features operable to reduce impact to product components stored therein from kitting tray movement;

a plurality of stored product components; and a product component list display device including a pick-to-lights system actuated by the coded kit trays, the product component list display device displaying the list of product components so that a kit tray with product components pulled from the stored product components and according to the product component list display device can be prepared; and an assembly unit coupled to the kitting unit and receiving the prepared kit tray from the kitting unit, the assembly unit having a first work cell including a work space for assembly of a product using the product components from the prepared kit tray.

49. The build-to-order product assembly system of claim 48 wherein the assembled product is a computer system including a chassis, a processor supported by the chassis, and a memory coupled to the processor, the plurality of component retaining features of the at least one of the kit trays providing greater protection than the chassis for at least one product component.

50. The build-to-order product assembly system of claim 48 wherein at least one of the plurality of component retaining features includes a mechanically insulating material.

51. The build-to-order product assembly system of claim 50 wherein the mechanically insulating material is foam.

* * * * *

UNITED STATES PATENT AND TRADEMARK OFFICE
CERTIFICATE OF CORRECTION

PATENT NO. : 6,236,901 B1
DATED : May 22, 2001
INVENTOR(S) : Lois Goss

It is certified that error appears in the above-identified patent and that said Letters Patent is hereby corrected as shown below:

Column 10, Line 9, through line 49,
Claim 1, should read:

-- 1. A product assembly system comprising:
a control unit capable of receiving a product order describing a product to be assembled, the control unit including a list of product components for the product to be assembled, wherein the product is a computer system including a chassis, a processor supported by the chassis and a memory coupled to the processor;
a kitting unit coupled to the control unit and receiving the list of product components, the kitting unit including:
 a kit tray;
 a plurality of stored product components; and
 a product component list display device, the product component list display device displaying the list of product components so that a prepared kit tray with product components pulled from the stored product components and according to the product component list display device is provided;
an assembly unit coupled to the kitting unit and receiving the prepared kit tray from the kitting unit, the assembly unit having a first work cell including a work space for assembly of the product using the product components from the prepared kit tray;
a chassis preparation unit coupled to the control unit and receiving the list of product components, the chassis preparation unit including:
 a plurality of chassis components; and
 a chassis preparation work space in which a prepared chassis is provided for a computer system according to the list of product components; and
a joining area coupled to the kitting unit and to the chassis preparation unit, the joining area receiving a prepared chassis and a prepared kit tray, the prepared chassis being added to the prepared kit tray before being sent to the assembly unit, wherein the control unit delivers the list of product components to the chassis preparation unit at a first time, and the control unit delivers the list of product components to the kitting unit at a second time, the first time and the second time being selected by the control unit so the prepared chassis and the prepared kit tray arrive at the joining area at approximately the same time.--

Column 11, Line 55, through Column 12, line 16,
Claim 15, should read:

-- 15. A manufacturing system for assembly of computer system in a build-to-order environment comprising:
a kitting unit housing a kit tray and computer system components, the kitting unit:
 including a code for generating a signal to indicate a list of components for assembling an ordered computer system; and
 displaying the list of components in a pick-to-lights system to at least one kitting operator to allow a prepared kit tray to be provided with computer system components for the ordered computer system by pulling selected computer system components from those housed at the kitting unit;
an assembly unit constructed to receive the prepared kit tray from the kitting unit, the assembly unit having a plurality of work cells operable in parallel, at least one work cell:
 providing work space and tools to allow a team of work cell operators to assemble an ordered computer system using the computer system components from the prepared kit tray; and
 providing an integrated quick test, shared by at least one other work cell, to allow a quick test operator to test the assembled computer system for basic functionality; and
an extended test unit constructed to receive assembled computer system from the work cells, the extended test unit providing work space and tools to allow at least one extended test operator to quality test assembled computer systems.--

UNITED STATES PATENT AND TRADEMARK OFFICE
CERTIFICATE OF CORRECTION

PATENT NO.   : 6,236,901 B1
DATED        : May 22, 2001
INVENTOR(S)  : Lois Goss It is certified that error appears in the above-identified patent and that said Letters Patent is hereby corrected as shown below:

<u>Column 13, Line 1, through line 18,</u>
Claim 22, should read:

--22. A method of assembling a product comprising:
receiving and display a list of components for assembling an ordered product;
providing a kit tray;
coding the kit tray;
generating a signal from the coded kit tray to indicate a list of product components;
identifying the product components from the list in a pick-to-lights system;
selecting the identified product components;
placing the product components in the kit tray to provide a prepared kit tray;
transferring the prepared kit tray to an assembly unit; and
assembling the ordered product in the assembly unit using the product components from the prepared kit tray.--

<u>Column 13, Line 65, through Column 14, line 17,</u>
Claim 33, should read:

--33. A computer system comprising:
a chassis;
a processor supported by the chassis; and
a memory coupled to the processor, the computer system assembled by:
  receiving and displaying a list of components for assembling the build-to-order computer system;
  providing a kit tray;
  coding the kit tray;
  generating a signal from the coded kit tray to indicate a list of product components;
  identifying the product components from the list in a pick-to-lights system;
  selecting the identified product components;
  placing the product components in the kit tray to provide a prepared kit tray;
  transferring the prepared kit tray to an assembly unit; and
  assembling the ordered product in the available work cell using the computer system components from the prepared kit tray.--

UNITED STATES PATENT AND TRADEMARK OFFICE
CERTIFICATE OF CORRECTION

PATENT NO. : 6,236,901 B1
DATED : May 22, 2001
INVENTOR(S) : Lois Goss

It is certified that error appears in the above-identified patent and that said Letters Patent is hereby corrected as shown below:

Column 14, Line 18 through line 47,
Claim 34, should read:

-- 34. A product assembly system comprising:
a kitting unit receiving a list of product components, the kitting unit including:
  a coded kit tray;
  a plurality of stored product components; and
  a product component list display device including a pick-to-lights system actuated by the coded kit tray, the product component list display device displaying the list of product components so that a prepared kit tray with product components pulled from the stored product components and according to the product component list display device is provided;
an assembly unit coupled to the kitting unit and receiving the prepared kit tray from the kitting unit, the assembly unit having a first work cell including a work space for assembly of a product using the product components from the prepared kit tray;
at least one of:
  a quick test cell coupled to the first work cell, the quick test cell operable to receive the assembled product and perform a test of basic functionality of the assembled product; and
  an extended test unit coupled to the assembly unit, the extended test unit operable to receive the assembled product from the assembly unit and perform a quality test of the assembled product; and
the at least one of a quick test cell and an extended test unit operable to provide information about failure of the respective test to the first work cell. --

Column 14, Line 64, through Column 15, line 29,
Claim 39, should read:

-- 39. A product assembly system comprising:
a kitting unit receiving a first list of product components and a second list of product components, the kitting unit including:
  a plurality of kit trays;
  a plurality of stored product components;
  a first product component list display device, the first product component list display device displaying the first list of product components so that a first prepared kit tray with product components pulled from the stored product components and according to the first product component list display device is provided; and
  a second product component list display device, the second product component list display device displaying the second list of product components so that a second prepared kit tray with product components pulled from the stored product components and according to the second product component list display device is provided;
  the product components of the first prepared kit tray having at least one difference with the product components of the second prepared kit tray; and
an assembly unit coupled to the kitting unit, the assembly unit operable to receive the first and the second prepared kit trays from the kitting unit, the assembly unit having a work cell including a work space for assembly of a product using the product components from one of the first and second prepared kit trays, assembly beginning when all of the components for the product are in the one of the first and second prepared kit trays, wherein all of the assembly of the product using the product components from one of the first and second prepared kit trays occurs in the assembly unit. --

UNITED STATES PATENT AND TRADEMARK OFFICE
CERTIFICATE OF CORRECTION

PATENT NO. : 6,236,901 B1
DATED : May 22, 2001
INVENTOR(S) : Lois Goss

It is certified that error appears in the above-identified patent and that said Letters Patent is hereby corrected as shown below:

Column 15, Line 64, through Column 16, line 16,
Claim 44, should read:

-- 44. A product assembly system comprising:
a kitting unit receiving a list of product components, the kitting unit receiving a list of product components, the kitting unit including:
  a coded kit tray;
  a plurality of stored product components; and
  a product component list display device including a pick-to-lights system actuated by the coded kit tray, the product component list display device displaying the list of product components so that a prepared kit tray with product components pulled from the stored product components and according to the product component list display device is provided; and
an assembly unit coupled to the kitting unit and receiving the prepared kit tray from the kitting unit, the assembly unit having a first work cell including a work space for assembly of a product using the product components from the prepared kit tray, the assembly occurring in an order and with a number of steps reducing damage to the product components. --

Column 16, Line 32, through Column 16, line 52,
Claim 48, should read:

-- 48. A product assembly system comprising:
a kitting unit receiving a list of product components, the kitting unit including:
  a coded kit tray including a plurality of component retaining features, the component retaining features operable to reduce impact to product components stored therein from kitting tray movement;
  a plurality of stored product components; and
  a product component list display device including a pick-to-lights system actuated by the coded kit tray, the product component list display device displaying the list of product components so that a prepared kit tray with product components pulled from the stored product components and according to the product component list display device is provided; and
an assembly unit coupled to the kitting unit and receiving the prepared kit tray from the kitting unit, the assembly unit having a first work cell including a work space for assembly of a product using the product components from the prepared kit tray. --

UNITED STATES PATENT AND TRADEMARK OFFICE
CERTIFICATE OF CORRECTION

PATENT NO.    : 6,236,901 B1
DATED         : May 22, 2001
INVENTOR(S)   : Lois Goss It is certified that error appears in the above-identified patent and that said Letters Patent is hereby corrected as shown below:

<u>Column 16, Line 65, through Column 14, line 17,</u>
Claims 52 and 53, at the end, please insert the following Claims 52 and 53:

-- 52. A method of assembling a plurality of specifically ordered products comprising:
    receiving and displaying a list of components for assembling each respective ordered product;
    for each ordered product:
        providing a kit tray;
        coding the kit tray;
        generating a signal from the coding on the kit tray to indicate a product component selection from the list;
        identifying the product component selection from the list in a component identifying system;
        selecting the product components which are identified;
        placing the product components in the kit tray to provide a prepared kit tray;
        transferring the prepared kit tray to an assembly unit;
        providing a prepared chassis to the assembly unit; and
        assembling the ordered product in the assembly unit using the prepared chassis and the product components from the prepared kit tray. --

-- 53. A plurality of specifically ordered computer systems each comprising:
    a chassis;
    a processor supported by the chassis; and
    a memory coupled to the processor, each ordered computer system assembled by:
        receiving and displaying a list of components for assembling the ordered computer system;
        providing a kit tray;
        coding the kit tray;
        generating a signal from the coding on the kit tray to indicate a product component selection from the list;
        identifying the product component selection from the list in a component identifying system;
        selecting the product components which are identified;
        placing the product components in the kit tray to provide a prepared kit tray;
        transferring the prepared kit tray to an assembly unit;
        providing the chassis to the assembly unit; and
        assembling the ordered product in the assembly unit using the chassis and the product components from the prepared kit tray. --

Signed and Sealed this

Twenty-first Day of October, 2003

JAMES E. ROGAN
*Director of the United States Patent and Trademark Office*